United States Patent [19]

Keith

[11] 4,372,251
[45] Feb. 8, 1983

[54] PREFABRICATED ANIMAL SHELTER

[75] Inventor: Alfred H. Keith, Minneapolis, Minn.

[73] Assignee: Dairy Farm Leasing Company, Minneapolis, Minn.

[21] Appl. No.: 248,249

[22] Filed: Mar. 27, 1981

[51] Int. Cl.$^3$ .............................................. A01K 1/00
[52] U.S. Cl. ........................................ 119/16; 119/19
[58] Field of Search ............... 119/16, 19, 20; 49/463, 49/465, 466; 52/79.1

[56] References Cited

U.S. PATENT DOCUMENTS

| | | | |
|---|---|---|---|
| 1,121,425 | 12/1914 | Wakeman | 119/19 |
| 1,750,026 | 3/1930 | Rowe | 119/16 |
| 1,973,029 | 9/1934 | Walston | 119/19 X |
| 2,712,677 | 7/1955 | Hyde | 119/16 X |
| 2,722,272 | 11/1955 | Sprinkle | 49/463 X |
| 3,256,860 | 6/1966 | Parker | 119/19 |
| 3,490,177 | 1/1970 | Perrion | 49/463 |
| 4,269,144 | 5/1981 | Ahrens | 119/16 |

Primary Examiner—Gene Mancene
Assistant Examiner—Robert P. Swiatek
Attorney, Agent, or Firm—Dorsey & Whitney

[57] ABSTRACT

A prefabricated individual calf shelter has front and back end walls, first and second side walls, a top wall and an open bottom. All the walls are formed of molded fiber glass or other plastic as elements of a single molded housing. An animal door is located at one side of the front wall and the other side of the front wall cooperates with its adjacent side wall to provide a sheltered corner area for the head and front body of the animal. A feed opening in the side wall provides external access to the sheltered corner and is selectively closed by a cover. An externally and manually operable retaining element selectively holds the cover in closed position. The fiber glass housing has its smooth gelcoat surface at the inside of each wall and a rougher surface at the outside. The housing includes reinforcing and drainage features arranged for convenient molding, stacking, transporting and farm use of the shelter.

10 Claims, 4 Drawing Figures

PREFABRICATED ANIMAL SHELTER

BACKGROUND OF THE INVENTION

In recent years, it has been found that newborn and relatively young calves can be fed and kept in better health if they are segregated from other animals by placing them in small outdoor shelters, even in cold climates, where they are not exposed to other animals or environmental conditions within the usual stock barn of a farm. Thus, there have been proposals for the use of individual shelters, one for each calf, but within which the calf can be fed and can grow during its early months of life. Various forms of animal shelters have previously been suggested for at least partially sheltering an individual animal of this type. Such individual shelters have included such features as door openings for both ventilation and access to the animal, and in some cases a separate feed door has been provided for insertion and removal of feed for the animal.

I have found a need, however, for an improved individual animal shelter which can be prefabricated and easily stored, transported and installed at desired farm locations.

SUMMARY OF THE INVENTION

The present invention accordingly provides a prefabricated animal shelter for calves and the like which includes a housing having front and back end walls, first and second opposite side walls and a top wall defining an open-bottomed portable shelter chamber, in which the front end wall has an offset animal door opening close to the first side wall and a closed end wall portion extending laterally from the second side wall to the door opening to provide a sheltered corner area within the housing dimensioned to accommodate and protect at least the head and front leg and body portions of an animal standing along the front wall inside the housing, and in which the second side wall has a feed opening close to the front end wall for insertion and removal of animal feed within the sheltered corner area. A cover is provided for selectively closing and uncovering the feed opening, and the invention provides externally and manually operable cover retaining means for selectively holding the cover in closed position. In the preferred embodiment, all of the housing walls are formed of molded fiber glass material as integrally connected elements of a complete housing. Such molded fiber glass materials normally have a rough or relatively unfinished surface on one side and a smooth gelcoat surface on the other side, and the present invention contemplates the molding of such a housing in which the smooth gelcoat surfaces of all the walls are located inside the prefabricated shelter.

The invention further provides structural features for reinforcement and improved drainage and ventilation of such a shelter, and these and other features and advantages of the invention will be apparent from the following detailed description.

BRIEF DESCRIPTION OF THE DRAWINGS

In the drawings which form a part of this application and in which like reference characters indicate like parts.

DESCRIPTION OF THE PREFERRED EMBODIMENTS

Figure 1:
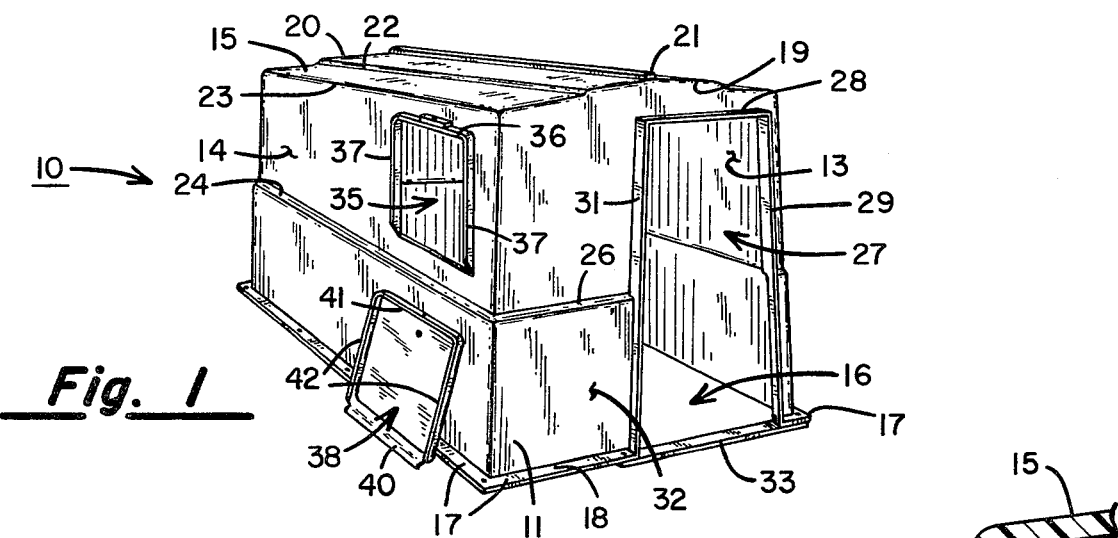
FIG. 1 is a front corner perspective view of a preferred embodiment in position for use, showing details of the animal door opening, feed opening and a removable cover for the feed opening.
Figure 2:
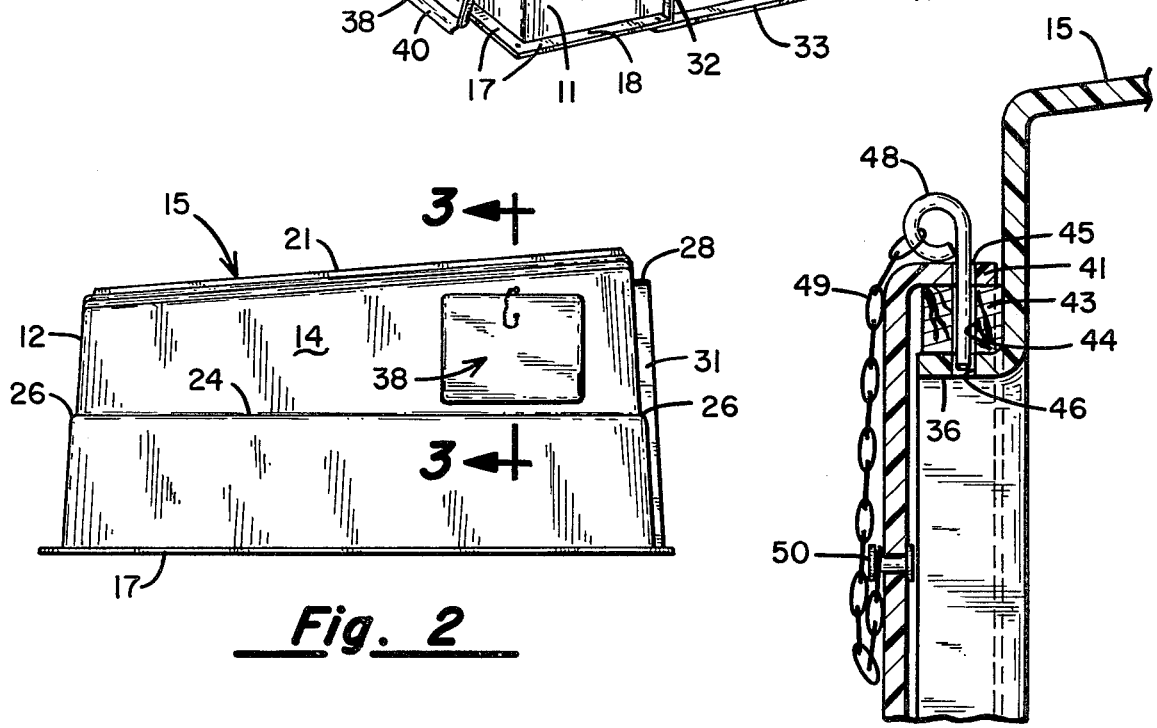
FIG. 2 is a side elevation of the shelter of FIG. 1.
Figure 4:
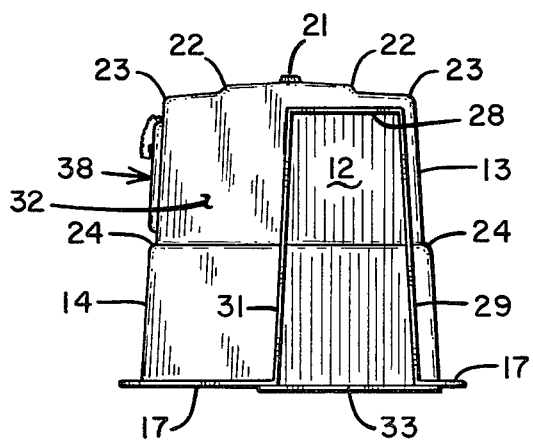
FIG. 4 is a front end view of the shelter of FIG. 1 with the feed opening cover in closed position.

The prefabricated calf shelter shown particularly in FIGS. 1, 2 and 4 includes a molded fiber glass housing 10 having a front wall 11, rear wall 12, first and second side walls 13 and 14, and a top wall 15 and an open bottom at 16. An outwardly extending support flange 17 at the lower edges of the front, rear and side walls may be provided with openings 18 for the insertion of ground stakes to hold the shelter in its desired ground location.

As shown particularly in FIGS. 1 and 2, the top of the front wall is higher than the top of the rear wall, so that the top wall 15 has an upper drainage surface sloping downwardly from the front wall to the rear wall. Thus, rain or melted snow from the top wall is diverted from the ground area near the front wall. The upper surface of top wall 15 is further provided with a longitudinal central reinforcing ridge 21 and two longitudinal reinforcing downward steps 22, one at each side of the central ridge. The top wall slopes generally laterally out from the central ridge and reinforcing steps to the edges 23 where the top wall meets the respective side walls. Thus, the top wall further provides a lateral drainage surface area from the central ridge toward each side wall.

Each of the side walls has a longitudinal reinforcing step 24, and the front and rear end walls have similar outwardly offset reinforcing steps 26 extending across such end walls, preferably as a smooth continuation of the steps 24 in the side walls.

In addition to the outward offset of the lower portion of the end and side walls resulting from the provision of reinforcing steps 24 and 26, these walls are also inclined outwardly from top to bottom, so that the horizontal distances between the respective end walls and between the respective side walls progressively increase from the top to the bottom of the shelter. This arrangement not only facilitates the initial molding of such a prefabricated animal shelter but also facilitates the stacking of a plurality of such units for storage or transportation and further provides a maximum bottom area for greater stability and use.

An animal door opening 27 is provided in the front wall 11. This opening is defined and reinforced by an outwardly projecting flange 28 at the top and sides of the door opening 27. One edge 29 of the door opening is located close to the first side wall, and the other door edge 31 is positioned near the vertical center of the front wall, so that the animal door opening is effectively offset laterally close to the first side wall 13 to provide a closed end wall portion 32 between the door edge 31 and the second side wall 14. This closed front end wall portion thus cooperates with the second side wall to provide a sheltered front corner area within the housing which is dimensioned to accommodate and protect at least the head and front leg and body portions of an animal standing crosswise along the front wall within the housing. This sheltered corner can be used for feeding the animal, while the offset door opening provides adequate space for entrance and exit of the animal to an adjacent small fenced open area (not shown), as well as adequate ventilation of the interior of the shelter without complete exposure of the interior to outside wind and temperature conditions.

An optional bottom reinforcing strip 33 may be connected across the bottom of the opening by securing its ends to the bottom support flanges 17 at each side of the door.

A feed opening 35 is provided in the second side wall 14 at a location which is close to the front wall 11 and preferably in the front upper portion or corner of side wall 14. Feed opening 35 is defined and reinforced by an outwardly projecting reinforcing flange 36 at the top edge of the opening and by vertical outward reinforcing side flanges 37 at each side of the opening.

A feed opening cover 38 is provided for selectively closing and uncovering the feed opening. The shelter unit is further provided with an externally and manually operable cover-retaining means for selectively holding the cover in the position which fully closes the feed opening, as in FIGS. 2 to 4. In the preferred embodiment, cover 38 is completely and selectively removable from the feed opening, and the cover retaining means involve a combination of the following features, as shown in FIG. 1 where the inside of the cover is shown in perspective and in the sectional view of FIG. 3, where the cover is locked or retained in closed position.

The lower edge of cover 38 has an inwardly and downwardly projecting bottom retaining flange 40 which is adapted for insertion through the bottom of feed opening 35 and for engagement with the bottom edge of the feed opening and the inner surface of the side wall, to prevent undesired outward removal of the lower cover edge. The cover is further provided with an inwardly projecting upper edge flange 41 and inwardly projecting side flanges 42, which are adapted to fit around the feed opening flanges 36 and 37, to overlap such flanges and to help define the closed position of cover 38 against side wall 14.

Figure 3:
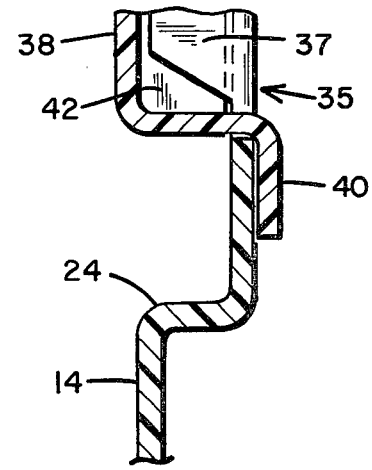
FIG. 3 is a partial sectional view on the line 3—3 of FIG. 2.

A reinforcing and retaining block 43 of wood or other suitable material is adhesively supported along the side wall and upper edge of feed opening flange 36 and is provided with a generally vertical opening 44 to receive a removable retaining pin 48 (FIG. 3). Further openings 45 and 46 in the respective cover flange 41 and feed opening flange 36 are adapted for alignment with opening 44 when the cover is in closed position. Insertion of retaining pin 48, as shown in FIG. 3, thus prevents outward removal of the upper portion of the cover, while flange 40 prevents outward removal of the lower portion of the cover, while the various cover flanges 41 and 42 overlap the feed opening flanges 36 and 37 to provide a firm and effective closure for the feed opening.

Retaining pin 48 is secured by a chain 49 or other flexible retaining line to a rivet member 50 to prevent inadvertent loss of the pin. In this case, rivet 50 is on the cover.

The constantly open offset animal door opening and the selectively covered feed opening constitute the only substantial openings in the side, end and top walls of the shelter housing. The top of the animal door opening is close to the top of the front wall, preferably at a level no lower than the top of the rear wall. Thus, there is an effective path or outlet along the sloping top wall and through the upper area of the animal door opening for air circulation and escape of moisture vapor and stale air from the inner rear areas of the housing. Moreover, the inside dimensions of the shelter are adequate to accommodate a small calf in either a longitudinal position generally parallel to the side walls or in a crosswise position generally parallel to the end walls. In the illustrated embodiment the outer width at the bottom of the end walls was substantially 4 feet and the outer length at the bottom of the side walls was substantially 8 feet, with a front wall center height of 48 inches sloping to 46 inches at the sides, a rear wall center height of 44 inches simlarly sloping to the sides, and an animal door height of 46 inches with a bottom width of 24 inches and a top width of 20 inches.

While the specific dimensions can be varied, the preferred arrangement is to maintain the interior shelter length twice as great as the interior shelter width. These relative dimensions, in combination with the sloping top wall and the relatively high upper edge of the animal door opening, are believed to provide an airflow arrangement or principle for improved internal ventilation along the top wall.

The portable, prefabricated animal shelter described herein is particularly adapted for manufacturing by plastic molding techniques. Fiber glass is the preferred material, with the gelcoat surface of such molded fiber glass positioned as the inner surface of all of the end, side, and top walls, and with the relatively unfinished surface at the exterior of the housing. This particular orientation of a smooth fiber glass gelcoat coating is believed to have advantages not only in the convenience of cleaning the interior of the shelter, but also in the establishment of total heat transmission and/or reflection characteristics for the various walls which help to maintain better temperature conditions within the shelter than in those cases where such a smooth or gelcoat plastic surface is located on the outside of the shelter, as in normal fiber glass molding operations. The smooth interior gelcoat surfaces are also considered to be safer for a young animal than a construction in which the interior surface is the usual rougher or unfinished side of a fiber glass wall with a potentially greater splinter risk.

It should be understood that the portable shelter of this invention has been designed and used primarily for calves, but is not necessarily limited to such use and may also have advantages in connection with other animals for which a segregated feeding and rearing environment may be desirable. Other advantages of the invention will be apparent from the description.

The foregoing specification accordingly sets forth certain preferred embodiments and modifications of the invention and some of the ways in which the invention may be put into practice, including the best mode presently contemplated for carrying out this invention. Modifications of the described embodiments, as well as alternate embodiments and devices for carrying out the invention, may also be apparent to those skilled in the art, within the spirit and scope of the following claims:

I claim:

1. In a prefabricated animal shelter housing for calves and the like having front and back end walls, first and second opposite side walls and a top wall defining an open-bottomed portable shelter chamber for a relatively newborn animal, the improved combination in which the front end wall has a constantly open, laterally-offset animal door opening close to the first side wall and a closed front end wall portion extending laterally from the second side wall to the door opening, said closed end wall portion and second side wall providing a sheltered front corner area within the housing dimensioned to accommodate and protect at least the head and front leg and body portions of an animal standing crosswise along the front wall within the housing, and in which the upper portion of the second side wall has a feed opening close to the front end wall for insertion and removal of animal feed within the sheltered corner area; a cover for selectively closing and uncovering said feed opening, and externally and manually operable cover retaining means for selectively holding the cover in a position fully closing the feed opening, said animal door constituting the only substantial opening in said side and end walls when said cover is held in said fully closed position and said animal door opening having a top edge close to the top of the front wall.

2. An animal shelter housing according to claim 1 in which all of said top, end and side walls are formed of molded plastic material and are integrally connected to each other as elements of a single molded plastic housing.

3. An animal shelter housing according to claim 2 in which the plastic walls are of molded fiber glass construction having a rough unfinished surface on one side and a smooth gelcoat surface on the other side, and in which the smooth gelcoat surfaces of all the walls are positioned inside the shelter housing.

4. An animal shelter housing according to claim 3 in which the animal door opening extends substantially halfway across the front end wall.

5. An animal shelter housing according to claim 4 in which the top wall has an upper drainage surface sloping downwardly from the front wall to the rear wall.

6. An animal shelter housing according to claim 5 in which the upper drainage surface of the top wall has a longitudinal central reinforcing ridge and two longitudinal reinforcing downward steps, one at each side of the central ridge, said steps and upper surface also providing a limited lateral drainage surface from the central ridge toward each side wall.

7. An animal shelter housing according to claim 6 in which the side and end walls each have at least one outwardly offset horizontal reinforcing step.

8. An animal shelter housing according to claim 7 in which the horizontal distances between the respective end walls and between the respective side walls progressively increase from the top to the bottom of the shelter.

9. An animal shelter housing according to claim 5 in which the interior shelter length is substantially twice the interior shelter width.

10. In a prefabricated animal shelter housing for calves and the like having front and back end walls, first and second opposite side walls and a top wall defining an open-bottomed portable shelter chamber for a relatively newborn animal, the improved combination in which the front end wall has an offset animal door opening close to the first side wall and a closed end wall portion extending laterally from the second side wall to the door opening and providing a sheltered corner area within the housing dimensioned to accommodate and protect at least the head and front leg and body portions of an animal standing crosswise along the front wall within the housing, and in which the second side wall has a feed opening close to the front end wall for insertion and removal of animal feed within the sheltered corner area; a cover for selectively closing and uncovering said feed opening, and externally and manually operable cover retaining means for selectively holding the cover in a position fully closing the feed opening, said animal door and feed openings constituting the only substantial openings in said side and end walls, in which all of said top, end and side walls are formed of molded plastic material and are integrally connected to each other as elements of a single molded plastic housing, and in which the second side wall has an outwardly projecting window-reinforcing flange around the top and side edges of the feed opening, and in which the cover for the feed opening is manually and fully removable from the second side wall, and said cover retaining means includes an inwardly and downwardly projecting bottom retaining flange on said cover for engagement inside the bottom edge of the feed opening, and an inwardly projecting upper edge flange on the cover overlapping at least the outside top portion of the window flange when the cover is in closed position, the upper cover edge flange and top window flange portion having cooperating aligned retaining openings therein when the cover is in closed position, and a manually removable retaining pin for selective insertion in said cooperating aligned retaining openings for holding the cover in closed position.

* * * * *